United States Patent
Punjabi et al.

(10) Patent No.: US 7,848,229 B2
(45) Date of Patent: Dec. 7, 2010

(54) SYSTEM AND METHOD FOR VIRTUAL CHANNEL SELECTION IN IP TELEPHONY SYSTEMS

(75) Inventors: Anil Punjabi, San Jose, CA (US); Kenney Ruyle, Campbell, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1522 days.

(21) Appl. No.: 10/439,976

(22) Filed: May 16, 2003

(65) Prior Publication Data

US 2004/0228327 A1  Nov. 18, 2004

(51) Int. Cl.
*H04L 12/26* (2006.01)
(52) U.S. Cl. ............... 370/229; 370/271; 370/468; 379/900; 709/228; 709/231; 709/232
(58) Field of Classification Search ............ 370/351, 370/352, 353, 354, 464, 465, 466, 468, 395.21, 370/271, 322, 329, 330, 332, 431, 437, 463; 379/900, 88.17, 406.01, 221.04, 221.15; 709/228, 231, 232; 375/222
See application file for complete search history.

(56) References Cited

U.S. PATENT DOCUMENTS

| | | | |
|---|---|---|---|
| 5,446,680 A | 8/1995 | Sekiya et al. | |
| 5,448,624 A | 9/1995 | Hardy et al. | |
| 5,450,438 A * | 9/1995 | Landry et al. | 375/222 |
| 5,513,213 A * | 4/1996 | Patel et al. | 375/222 |
| 5,796,942 A | 8/1998 | Esbensen | |
| 5,812,529 A | 9/1998 | Czarnik et al. | |
| 5,850,388 A | 12/1998 | Anderson et al. | |
| 5,857,009 A | 1/1999 | Handig | |
| 5,974,237 A | 10/1999 | Shurmer et al. | |
| 6,061,722 A | 5/2000 | Lipa et al. | |
| 6,108,782 A | 8/2000 | Fletcher et al. | |
| 6,356,545 B1 * | 3/2002 | Vargo et al. | 370/355 |
| 6,614,781 B1 * | 9/2003 | Elliott et al. | 370/352 |
| 6,633,582 B1 * | 10/2003 | Panburana et al. | 370/465 |
| 6,735,175 B1 * | 5/2004 | Havens | 370/236 |
| 6,741,858 B1 * | 5/2004 | Back et al. | 370/332 |

(Continued)

FOREIGN PATENT DOCUMENTS

EP  1 024 638  8/2000

(Continued)

OTHER PUBLICATIONS

Hiroshi Sasaki : "Java Call Control V1.0 to Session Initiation Protocol Mapping"; Jain Community, 'Online!' Oct. 25, 2001, pp. 1-76, XP002316060.

(Continued)

*Primary Examiner*—Kwang B Yao
*Assistant Examiner*—Jeffrey M Rutkowski

(57) ABSTRACT

A ToL client is provided having, e.g., a key or button for the user to press or click when a voice problem arises. A controller maintains a set of predetermined "channels" having various voice quality settings, for example, related to codec selection, noise filters, jitter buffer size, echo cancellation, and the like. The user can select one of the channels and the connection will transfer over to using the parameters indicated. On subsequent uses, the new "best" channel can be the default or first selected.

19 Claims, 6 Drawing Sheets

U.S. PATENT DOCUMENTS

| | | | |
|---|---|---|---|
| 6,937,582 B1* | 8/2005 | Kronestedt | 370/329 |
| 6,977,911 B1* | 12/2005 | Geen et al. | 370/328 |
| 7,023,839 B1* | 4/2006 | Shaffer et al. | 370/356 |
| 7,027,418 B2* | 4/2006 | Gan et al. | 370/329 |
| 7,167,451 B1* | 1/2007 | Oran | 370/252 |
| 7,224,697 B2* | 5/2007 | Banerjea et al. | 370/401 |
| 7,295,549 B2* | 11/2007 | Pepin et al. | 370/352 |
| 7,630,339 B2* | 12/2009 | Laroia et al. | 370/330 |
| 2002/0101854 A1 | 8/2002 | Siegrist et al. | |
| 2002/0114320 A1* | 8/2002 | Ogren | 370/352 |
| 2002/0136162 A1* | 9/2002 | Yoshimura et al. | 370/229 |
| 2003/0012159 A1 | 1/2003 | Vassilovski et al. | |
| 2003/0035414 A1* | 2/2003 | Beyda | 370/352 |
| 2003/0053618 A1* | 3/2003 | Marchok et al. | 379/406.01 |
| 2003/0059005 A1* | 3/2003 | Meyerson et al. | 379/88.17 |
| 2004/0032860 A1* | 2/2004 | Mundra et al. | 370/352 |
| 2004/0032876 A1* | 2/2004 | Garg et al. | 370/443 |
| 2004/0062260 A1* | 4/2004 | Raetz et al. | 370/412 |
| 2004/0160945 A1* | 8/2004 | Dong et al. | 370/352 |
| 2004/0160963 A1* | 8/2004 | Dong et al. | 370/395.21 |
| 2004/0213204 A1* | 10/2004 | Yang | 370/352 |
| 2004/0249955 A1 | 12/2004 | Wuerful | |
| 2006/0029041 A1* | 2/2006 | Jabri et al. | 370/352 |
| 2006/0174015 A1* | 8/2006 | Arauz-Rosado | 709/228 |

FOREIGN PATENT DOCUMENTS

| | | |
|---|---|---|
| EP | 1109368 A2 | 6/2001 |
| JP | 06326661 A * | 11/1994 |
| WO | WO 01/50725 A1 | 7/2001 |

OTHER PUBLICATIONS

Glasmann J et al : "Service development and deployment in H.323 and SIP" ; IEEE Conference Proceedings Article, Jul. 3, 2001, pp. 378-385, XP010552562.

Schulzrinee H et al: "The Session Initiation Protocol: Internet-Centric Signaling" IEEE Communcations Magazine, IEEE Service Center. Piscataway, NY, US, vol. 38, No. 10, Oct. 2000, pp. 134-141, XP 00096936.

RMON, Catalyst Workgroup Switch, http://www.cisco.com/warp/public/614/4.html, 10 pages total.

* cited by examiner

| Channel | No. |
|---|---|
| Intelligent Improvement I | 19 |
| Intelligent Improvement II | 20 |
| Intelligent Improvement III | 21 |
| Last Successful Setting | 1 |
| Jitter Buffer (Abort) | 2 |
| Jitter Buffer (Long) | 3 |
| ⋮ | ⋮ |

FIG. 5A

| Channel | No. |
|---|---|
| G.711 / JBnormal / Noise normal | 7 |
| | 1 |
| | 2 |
| | 3 |
| | 4 |
| | 5 |
| | 6 |
| | 8 |

FIG. 5B

| Channel | No. | Description |
|---|---|---|
| Hall | 1 | Last successful |
| Cubicle | 2 | Jitter buffer |
| Noise | 3 | Jitter buffer |
| ⋮ | ⋮ | ⋮ |

SYSTEM AND METHOD FOR VIRTUAL CHANNEL SELECTION IN IP TELEPHONY SYSTEMS

BACKGROUND OF THE INVENTION

The present invention relates to communications systems and, in particular, to an improved system for improving voice quality in a telephony over LAN (ToL) system.

Internet Protocol (IP) telephony and Telephony over LAN (ToL) systems allow voice or other media to be transported over the same network as user data. Such systems typically attempt to establish voice connections of the highest quality the network will support. For example, certain systems negotiate a "highest quality" codec or other setting during call establishment. Still other systems have preconfigured codec settings of relatively high quality.

Once a call is connected, the voice quality can deteriorate if the network gets clogged with other user data, such as multiple large print jobs or large file transfers. Because load on the network can be highly variable, both in terms of volume and type of data, it can be difficult to anticipate deterioration in voice quality and thus select an appropriate voice quality setting. Commonly-assigned U.S. patent application Ser. No. 09/668,038 filed Sep. 21, 2000, titled SYSTEM AND METHOD FOR TROUBLESHOOTING TOL SYSTEM VOICE QUALITY, which is hereby incorporated by reference in its entirety as if fully set forth herein, describes a system for reporting network or voice quality problems identified by a user during the course of a call. While such reporting may enhance a system administrator's ability to configure future settings, it does not necessarily help with an ongoing call.

Certain systems allow a user to change system settings by parsing through sets of menu options. The typical user, however, is not necessarily sophisticated enough to be able to make a desired change. For example, the average telephone user probably does not know the difference between a G.723 and a G.729 codec.

Some cordless telephone systems allow a user to change a channel between handset and base station by pushing a button during the course of a call. Other than being on substantially adjacent frequency bands, each channel is essentially the same in terms of voice quality settings and the choice is essentially random. Such trial and error systems have met with only moderate success.

As such, there is a need for an IP telephony system that allows a user to continue a call even while other network activity causes a deterioration in voice quality. There is a further need for an IP telephony system that allows a user to change voice quality settings during a call.

SUMMARY OF THE INVENTION

These and other drawbacks in the prior art are overcome in large part by a system and method according to the present invention.

According to an implementation of the invention, a ToL client is provided having, e.g., a key or button for the user to press or click when a voice problem arises. A controller maintains a set of predetermined "channels" having various voice quality settings, for example, related to codec selection, noise filters, jitter buffer size, echo cancellation, and the like. The user can select one of the channels and the connection will transfer over to using the parameters indicated. On subsequent uses, the new "best" channel can be the default or first selected.

An H.323 client according to another embodiment of the present invention includes a virtual channel controller and a user interface. The virtual channel controller maintains a database of virtual channels and associated system settings. In operation, a user can employ the user interface to change system settings if the current ones are determined to be inadequate during a call. The virtual channel controller can then remember the "most recently used" virtual channel and use that to set up the next call. The user interface may provide the channel with numbers for identification or may provide a mnemonic related to the conditions under which the particular channel's use may be optimal. The H.323 client according to embodiments of the present invention may renegotiate an H.245 channel in response to a virtual channel selection. In certain embodiments, a backup H.245 channel may be provided or set up in response to the virtual channel selection.

In certain embodiments, a ToL client may further be provided with an inference engine which may receive feedback from RTCP statistics and other information. The inference engine may provide suggestions, which may be delivered to the user for consideration as one of the virtual channels.

BRIEF DESCRIPTION OF THE DRAWINGS

A better understanding of the invention is obtained when the following detailed description is considered in conjunction with the following drawings in which:

FIG. 5A-FIG. 5C illustrate user interfaces according to embodiments of the present invention;

DETAILED DESCRIPTION OF SPECIFIC EMBODIMENTS

Figure 1:
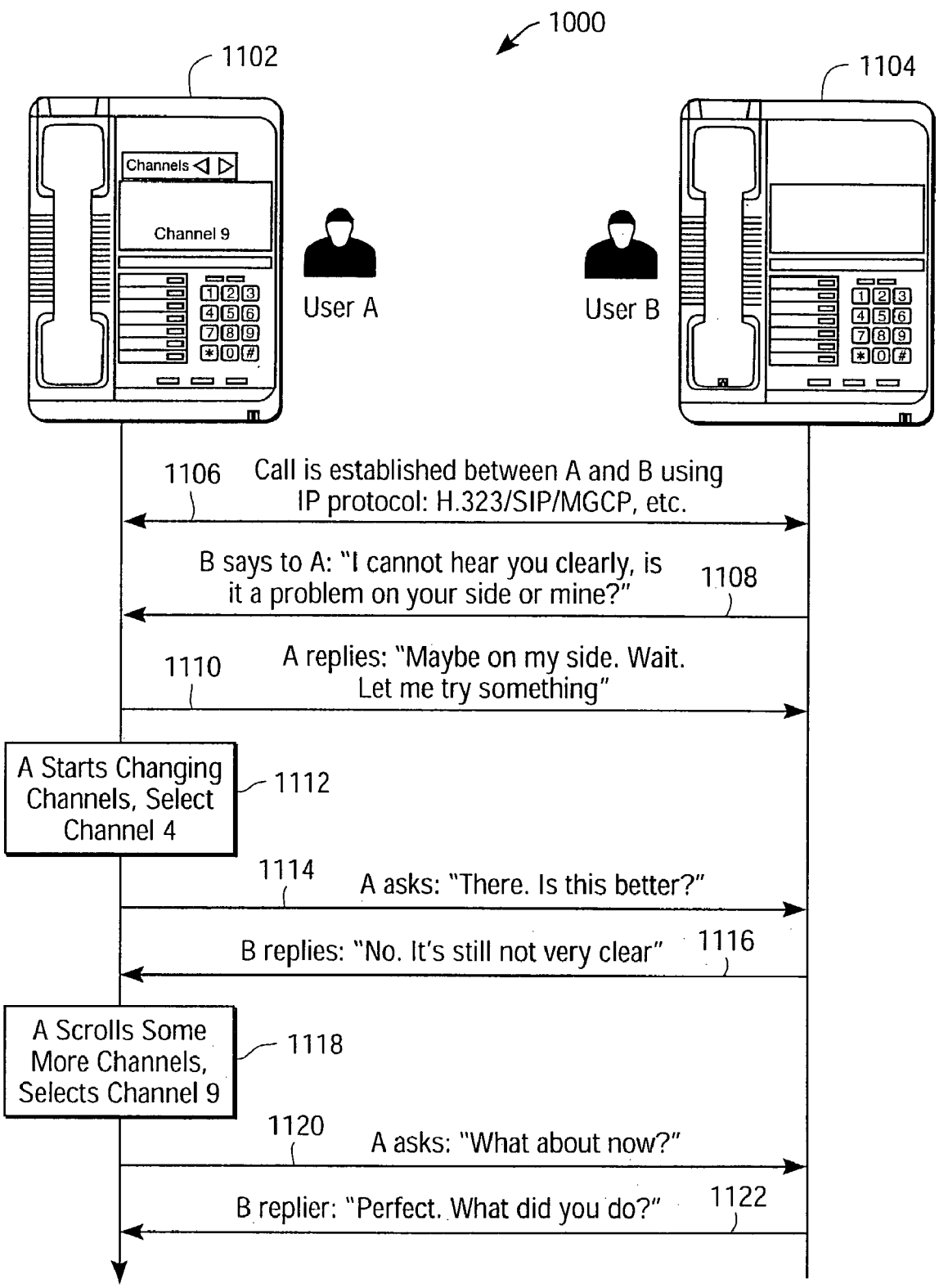
FIG. 1 is a diagram illustrating an interaction between users according to an embodiment of the present invention.

Turning now the drawings and with particular attention to FIG. 1, a diagram illustrating an exemplary user-to-user interaction 1000 according to embodiments of the present invention is shown. Shown are a User A 1102 and a User B 1104. As will be described in greater detail below, the User A 1102 may be provided with a virtual channel selection system according to embodiments of the present invention. In operation, at 1106, a call using an IP telephony protocol can be established between User A 1102 and User B 1104. Suitable IP telephony protocols include Recommendation H.323, SIP, MGCP, and the like. At 1108, the User B 1104 identifies a problem to User A. At 1110, User A 1102 tells the User B that he will try to fix the problem. At 1112, the User A employs the virtual channel selector to change channels and selects, for example, channel 4. At 1114, once the change has been made a processed, the User A 1102 can request feedback as to whether the change was effective. If, as seen at 1116, the User B 1104 responds that the change was ineffective, then at 1118, the User A can try to select another virtual channel. At 1120, the User A 1102 can again request feedback from User B. In the example illustrated, at 1122, the second change was effective.

Figure 2:
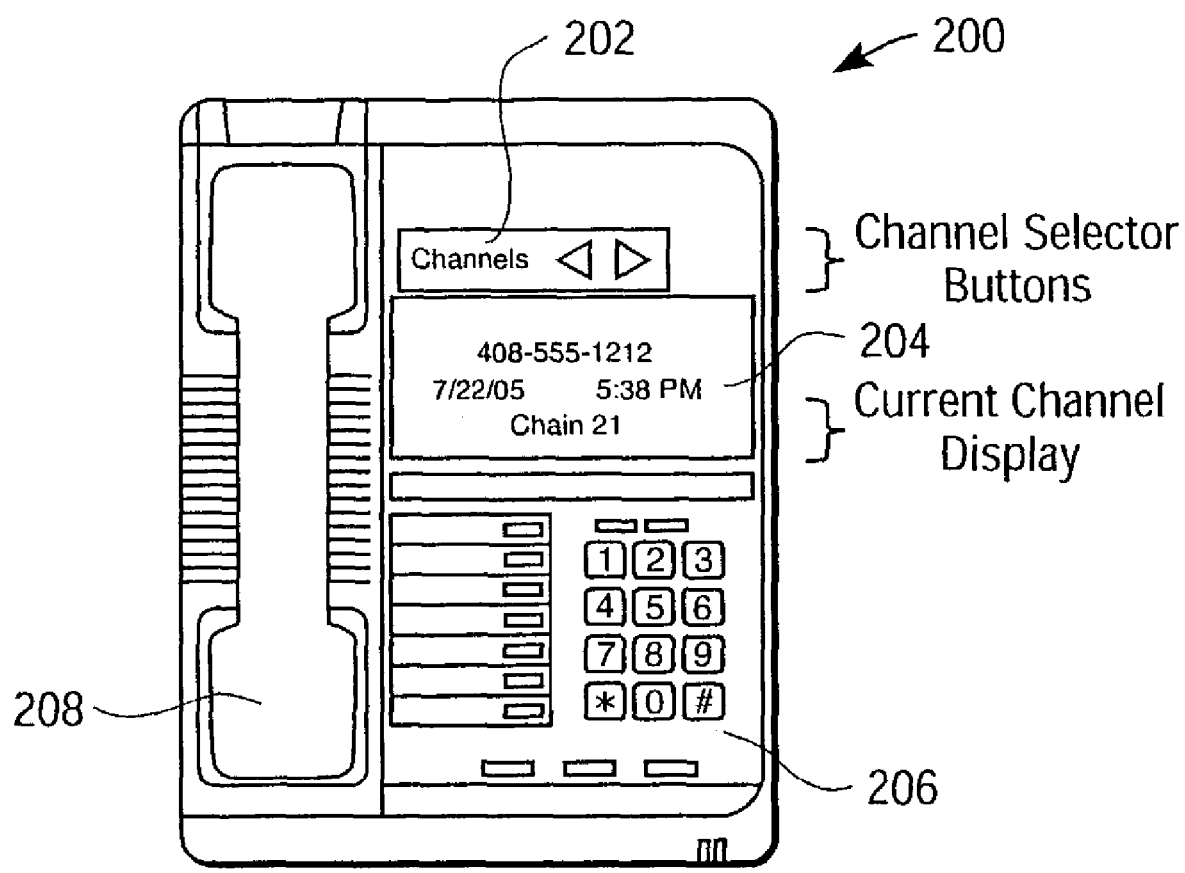
FIG. 2 is a diagram of an exemplary ToL telephone according to an embodiment of the present invention.

FIG. 2 illustrates an exemplary ToL telephone including a user interface according to an embodiment of the present invention. As shown, the telephone 200 includes a handset 208 and keypad 206 which may, for example, be typical in a desktop telephone. In addition, the telephone 200 includes a display 204, such as a liquid crystal display (LCD) which can be used to display, for example, called party number, time, date, and virtual channel according to embodiments of the present invention. In addition, a virtual channel selection interface 202 may be provided, to allow the user to select the desired virtual channel. As shown, the virtual channel selection interface may be embodied as one or more direction keys for scrolling a menu and selecting a highlighted channel.

Figure 3:
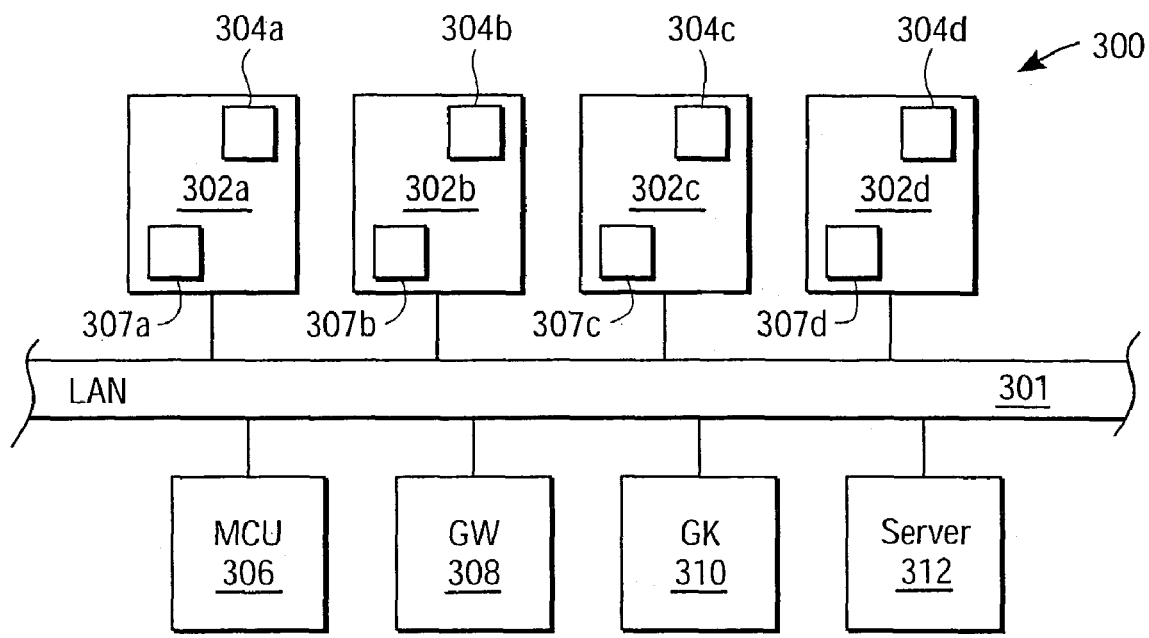
FIG. 3 is a block diagram of a telecommunications system according to an embodiment of the present invention.

An exemplary IP protocol telecommunications system suitable for implementing the virtual channel selection according to embodiments of the present invention is shown in FIG. 3. In particular, the IP protocol communication system 300 may be embodied as an H.323 Recommendation-compatible system. It is noted that, while described herein with regard to an H.323 network, the invention is equally applicable to networks such as MGCP (Media Gateway Control Protocol), SIP+(Inter MGS Protocol), SGCP, MEGACO, and generally, any voice or multimedia over IP scheme. Further, it is noted that an exemplary generic H.323 system is the HiPath™ telephony over LAN system, available from Siemens.

The telecommunications system 300 includes a local area network (LAN) or packet network 301 and, particularly, an Ethernet LAN. Coupled to the LAN 301 may be a variety of H.323 terminals 302a-d, a multi-point control unit (MCU) 306, an H.323 gateway 308, an H.323 gatekeeper 310, a LAN server 312, and a plurality of other devices such as personal computers (not shown). The H.323 terminals 302a-d are in compliance with the H.323 Recommendation and may be implemented as ToL telephones or endpoints, such as shown in FIG. 2. Further, the H.323 terminals 302a-d include virtual channel control modules 304a-304d, and associated memories 307a-307d, for storing virtual channel selections, as will be explained in greater detail below.

Figure 4:
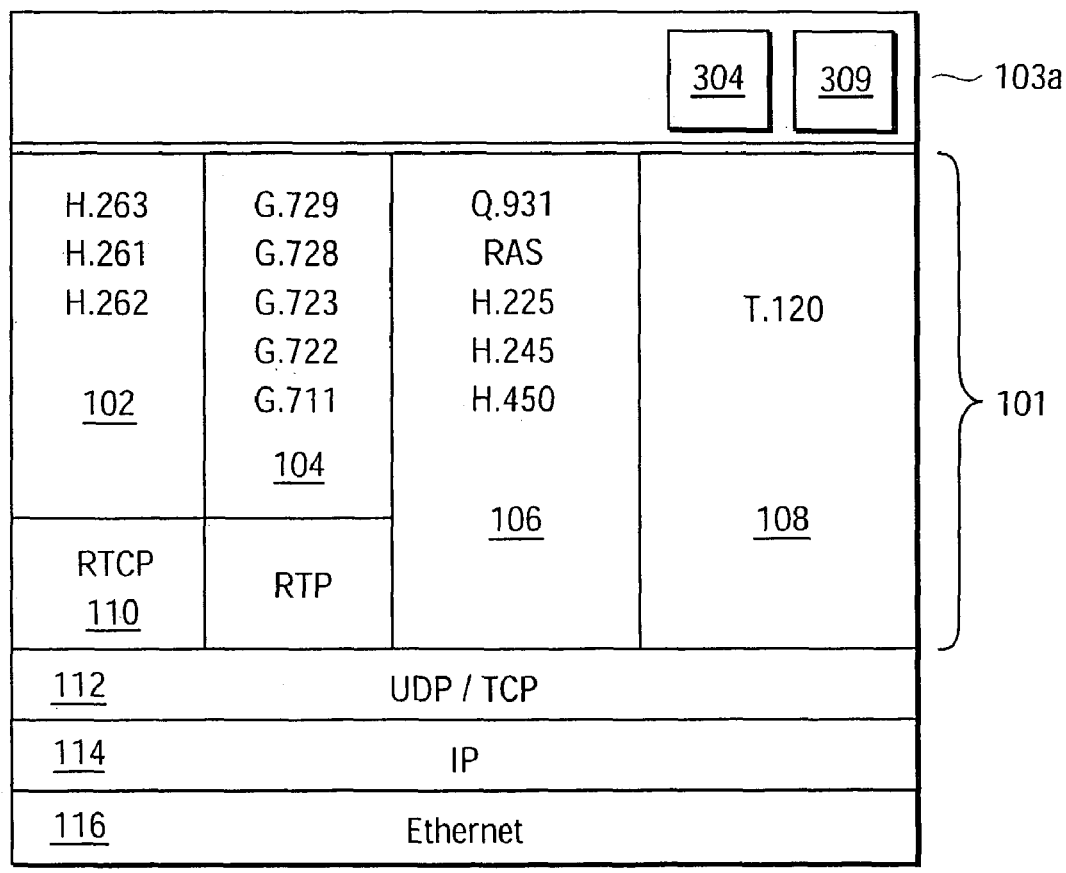
FIG. 4 is a protocol stack including a virtual channel selector according to an embodiment of the present invention.

More particularly, FIG. 4 illustrates a protocol stack according to an implementation of the invention. At the top are one or more application programs 103a. The application programs 103 may be embodied as one or more telephony programs, such as fax, voice, video, and the like. Further, as will be explained in greater detail below, one such application program may be a virtual channel control module 304.

Next in the protocol stack is an Internet Protocol voice communication stack, such as an H.323 protocol stack 101. Thus, the H.323 stack includes video codecs 102, such as H.261, H.262, and H.263 video codecs; audio codecs 104, such as G.711, G.722, G.723, G.728, G.729 audio codecs; a control layer or call setup unit 106 supporting H.245 control signaling for negotiation of media channel usage, Q.931 (H.225.0) for call signaling and call setup, and H.225.0 Registration, Admission and Status (RAS); and may also support H.450 supplementary services; a data layer 108 supporting T.120 for data conferencing; and an RTP/RTCP layer 110. The Internet Protocol voice communication stack 101 lies atop a UDP/TCP layer 112 and an IP layer 114.

As will be explained in greater detail below, the virtual channel control module 304 provides a user interface such as the channel selector 202 and display 204 of FIG. 2. The user can use the interface to select a new virtual channel. The system will then negotiate a change in system settings to the new virtual channel settings. The settings can then be stored in memory 307.

In addition to changing codecs, exemplary parameters which may be adjusted include the jitter buffer, noise filter, and echo filter.

Jitter Buffer: When the packets are sent into the network, they are generated at a constant rate. However, due to behavior of the packet network, the even time intervals between the packets are lost as the packets transit the network. This irregularity in packet separation is referred to as "jitter." Jitter can cause clicks, delays and other annoyances in multimedia transmission, creating overall poor reproduction quality.

A jitter buffer is often used to even out the packet separation. A jitter buffer is a FIFO (first in, first out) buffer in which packets leave the buffer at a predetermined, constant rate. Minimizing the amount of actual jitter buffering is important because the jitter buffering process introduces delays in the reproduced signal. Excessive buffering delays transmission output, while under-buffering causes gaps in the data. Accordingly, a jitter buffer according to embodiments of the present invention has a depth that can be adjusted dynamically according to the varying jitter of the current sequence.

Exemplary systems for adjusting jitter buffer depth are disclosed in co-pending, commonly-assigned U.S. patent application Ser. No. 09/440,215, titled JITTER BUFFER ADJUSTMENT ALGORITHM; and U.S. patent application Ser. No. 09/440,456, titled APPARATUS AND METHOD FOR ADAPTIVE JITTER BUFFERS, which are incorporated by reference in their entirety as if fully set forth herein.

Noise Filter: Noise can result from a variety of sources. One or more digital filters may be provided according to embodiments of the present invention to compensate. For example, a variety of broadband filters may be provided to suppress broadband noise down to predetermined levels, such as −10 dB or −20 dB.

Echo Filter: Echo results primarily from a reflection of the transmitted signal back to the person talking. The echo may be suppressed or cancelled using a variety of techniques, such as adaptive filtering. In certain embodiments of the present invention, bandwidth, etc., of the echo filters may be adjusted depending on the virtual channel selected.

Furthermore, certain embodiments of the present invention may also employ an inference engine or other algorithm 306 to analyze RTCP statistics and select parameters based on the past data. Such an inference engine 306 may be implemented as any combination of software, firmware, and/or hardware suitable to read RTCP statistics, and perform operations based on the statistics, e.g., to change a virtual channel. In particular, as is known, RTCP (real time control protocol) is used to send control packets containing information about the quality of a particular RTP (real time protocol) session including, for example, jitter and delay. Thus, for example, the inference engine 306 can read the RTCP statistics and determine if the jitter falls within predetermined parameters. If so, the system can change jitter settings via use of a different virtual channel.

In one embodiment of the present invention, twenty-one (21) virtual channels may be provided, as set forth in Table 1, below:

| Channel No. | Desired Effect | Action Taken |
|---|---|---|
| 1. | Last Successful setting | Switch back to the last successful setting that had worked for the user. |
| 2. | Jitter Buffer (Short) | Set a shorter Jitter Buffer (Short) |
| 3. | Litter Buffer (Long) | Set a shorter Jitter Buffer (Long) |
| 4. | Noise Filter (−10 db cut) | Adjust Noise Filter to cut (−10 db) |
| 5. | Noise Filter (−20 db cut) | Adjust Noise Filter to cut (−20 db) |
| 6. | Echo Filter Adjustment | Adjust echo filter to improve sound quality. |
| 7. | Voice Codec: G.711 + Jitter Buffer (Normal) + Noise Filter (Normal) | Drop current H.245 channel, tro to re-establish channel with G.723 as the preferred calling method. If it fails go back to the previous codec setting. |
| 8. | Voice Codec: G.711 + Jitter Buffer (Short) | Drop current H.245 channel, try to re-establish channel with G.723 as the preferred calling method. If it fails go back to the previous codec setting. + Jit Buf (Short) |
| 9. | Voice Codec: G.711 + Jitter Buffer (Long) | Drop current H.245 channel, try to re-establish channel with G.723 as the preferred calling method. If it fails go back to the previous codec setting. + Jit Buf (Long) |
| 10. | Voice Codec: G.711 + Noise Filter (−10 db cut) | Drop current H.245 channel, try to re-establish channel with G.723 as the preferred calling method. If it fails go back to the previous codec setting. + Noise Filter (−10 db) |
| 11. | Voice codec: G.711 + Noise Filter (−20 db cut) | Drop current H.245 channel, try to re-establish channel with G.723 as the preferred calling method. If it fails go back to the previous codec setting. + Noise Filter (−20 db) |
| 12. | Voice Codec: G.729 + Jitter Buffer (Normal) + Noise Filter (Normal) | Drop current H.245 channel, try to re-establish channel with G.729 as the preferred calling method |
| 13. | Voice Codec: G.729 + Jitter Buffer (Short) | Drop current H.245 channel, try to re-establish channel with G.729 as the preferred calling method + Jit Buf (Short) |
| 14. | Voice Codec: G.729 + Jitter Bufeer (Long) | Drop current H.245 channel, try to re-establish channel with G.729 as the preferred calling method + Jit Buf (Long) |
| 15. | Voice Codec: G.729 + Noise Filter (−10 db cut) | Drop current H.245 channel, try to re-establish channel with G.729 as the preferred calling method + Noise Filter (−10 db) |

-continued

| Channel No. | Desired Effect | Action Taken |
|---|---|---|
| 16. | Voice Codec: G.729 + Noise Filter (−20 db) | Drop current H.245 channel, try to re-establish channel with G.729 as the preferred calling method + Noise Filter (−20 db) |
| 17. | Intelligent Improvement 1 | Based on feedback from the RTCP statistics and other information, the inference engine might offer improvements. Multiple actions might be taken like voide codec and payload delay is modified. |
| 18. | Intelligent Improvement 2 | Based on feedback from the RTCP statistics and other information, the interference engine might offer improvements. Multiple actions might be taken like voide codec and payload delay is modified. $2^{nd}$ suggested result from the inference engine. |
| 19. | Intelligent Improvement 3 | Based on feedback from the RTCP statistics and other information, the interference engine might offer improvements. Multiple actions might be taken like voide codec and payload delay is modified. $3^{rd}$ suggested improvement from the inference engine. |
| 20. | RSVP-Bandwidth Reservation | Channel allows bandwidth reservation specification request |
| 21. | QoS | Channel delivers specified Quality of Service |

It is noted that, in other embodiments, more or fewer than 21 channels may be available.

Furthermore, the channels could be arranged in a variety of ways in the user interface. For example, as shown in FIG. 5A, in certain embodiments, the "Intelligent Improvement" channels could be listed first. In other embodiments, as shown in FIG. 5B, the most-recently used channel could be listed first or otherwise highlighted by shading or different font. In still other embodiments, the user could save a particular channel as a default (first-used) channel or as a highlighted or first-listed channel.

Finally, it is noted that, while a user interface could simply display channel numbers and a brief description of their function, in other embodiments it may be more desirable to provide useful mnemonics associated with the channel. For example, as shown in FIG. 5C, depending on when their utility is the greatest, channel could be assigned names such as "Hall," "Cubicle," "Noise," etc.

As can be appreciated, while some of the virtual channels can be implemented exclusively on one side or the other of the transaction, in certain of the virtual channels, a re-negotiation of the H.245 control channel must be made. In some embodiments this may result in a brief loss of the media channel. In other embodiments, however, clients may be provided with more than one H.245 module, so that they can set up a second H.245 channel while the first is still in operation. In this way, the second H.245 module can come on line as soon as the first is disconnected.

Figure 6:
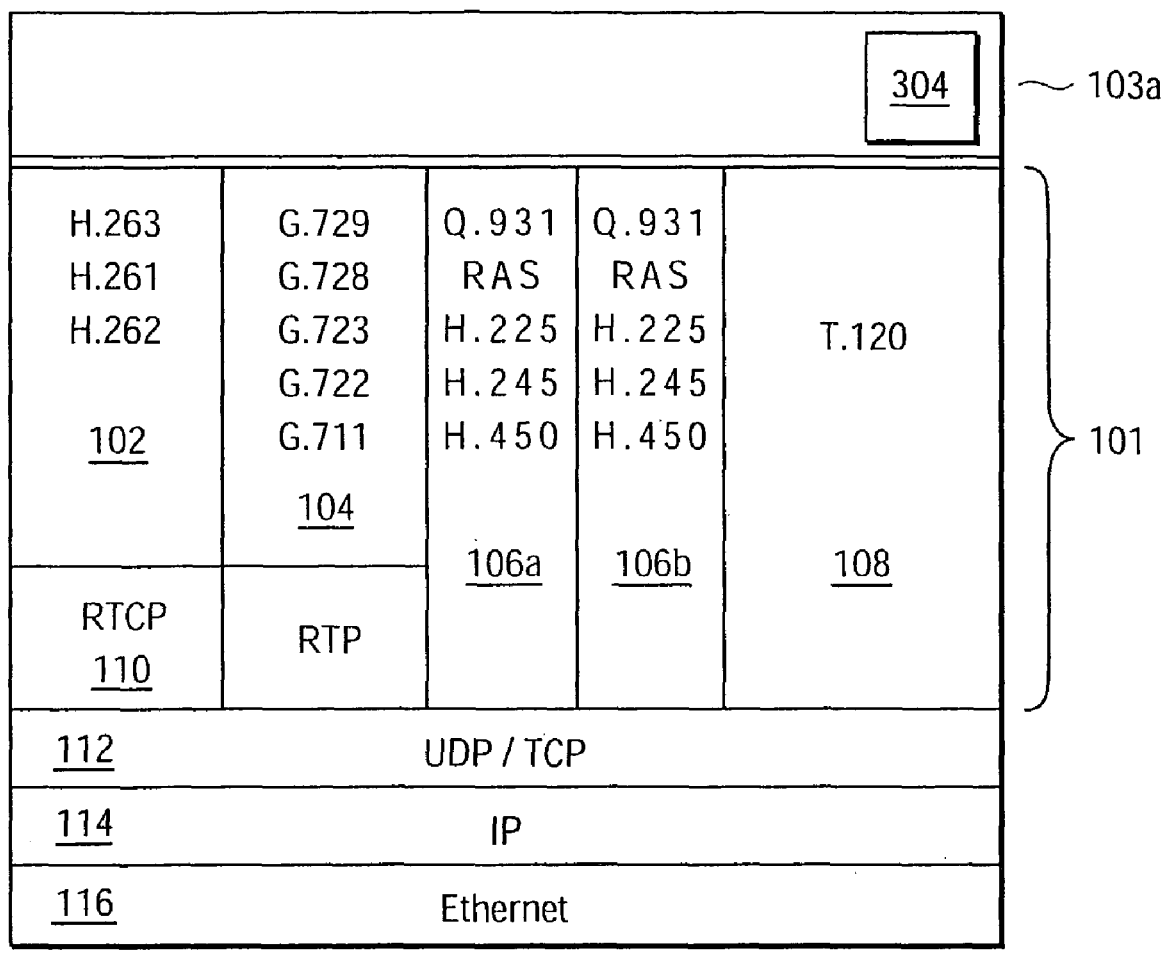
FIG. 6 is a protocol stack including a virtual channel selector according to an embodiment of the present invention.

In other embodiments, however, the client may be provided with a second H.323 stack and, particularly, a second H.323 control layer. One such H.323 stack is shown in FIG. 6. More particularly, the H.323 stack of FIG. 6 includes first and second H.245 layers 106a, 106b. As will be described in greater detail below, in one embodiment, the client will use the first layer 106a to establish the H.323 media channel. If the user then selects one of the virtual channels, the system will use the layer 106b to set up a secondary H.245 channel and will activate the new media channel when the previous one is released. In this way, the time between changes can be minimized.

Figure 7:
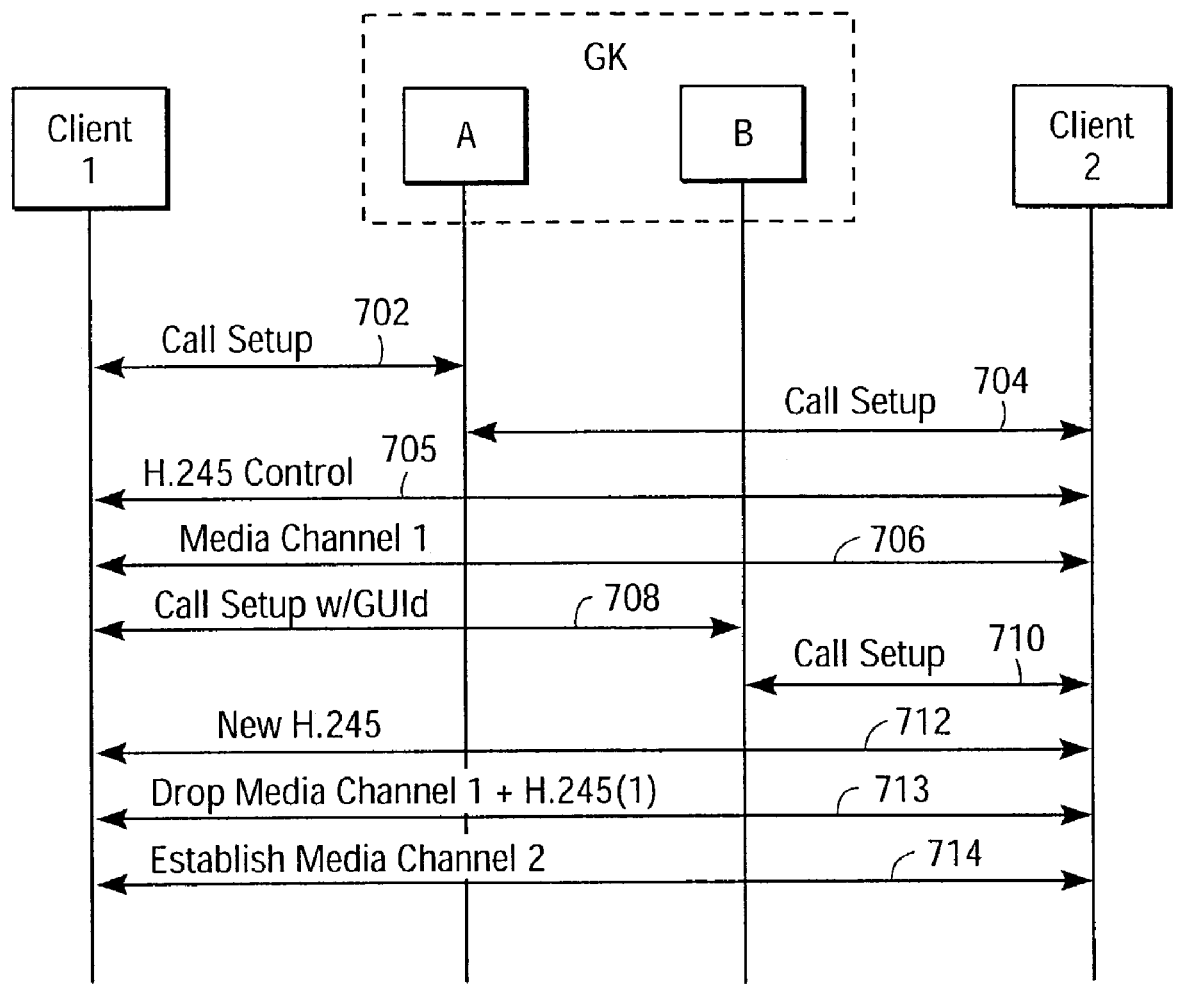
FIG. 7 illustrates signaling according to an embodiment of the present invention.

FIG. 7 illustrates the signaling for operation of an embodiment of the invention. It is noted that while the signal paths are shown as direct connections, typically, signaling is conducted via the LAN. As shown, a gatekeeper, GK, and a pair of client terminals or endpoints Client 1 and Client 2 are connected to the LAN 101. The endpoints Client 1 and Client 2 include redundant H.323 stacks 106 according to embodiments of the present invention. The gatekeeper GK is typically capable of handling more than one connection at a time, as represented by A and B.

If Client 1 initiates a call to Client 2 according to a particular virtual channel, it sends an H.225.0 Setup message(s), including a globally unique call identifier (GUId), to its primary gatekeeper GK along signaling path 702. As is known, the H.225 setup and signaling message(s) include an Admission Request (ARQ) and Admission Confirm (ACF) exchange, as well as Alerting and Connect messaging. The H.323 call setup also includes a capability exchange to allow the endpoints to determine that a redundancy layer is available at both ends.

In response to the received H.225.0 Setup message, the gatekeeper GK sends an H.225.0 Setup message to the endpoint Client 2 along signaling path 704. Client 2 responds along the signaling path 704 and at 705, an H.245 control channel is set up. The control channel is used to determine endpoint capabilities and appropriate coding algorithms, and the like. The call is set up in the standard fashion when the media channel 706 is then established directly between the endpoints, Client 1 and Client 2.

As discussed above, the Client 1, for example, can attempt to change virtual channels. If he does so, then at path 708, Client 1 sends a new H.225.0 Setup message to the gatekeeper GK. The gatekeeper GK then sends H.225.0 Setup message(s) to the endpoint Client 2 along signaling path 710. The H.225.0 Setup message contains the same globally unique call identifier (GUId) as the first H.225.0 Setup message for the primary call. Alternatively, the GUId's could be related according to a predetermined algorithm, such as sequentially, so long as the Client 2 can recognize the call set up being received as being for a new virtual channel. The endpoint Client 2 recognizes the GUId as identifying a new virtual channel signaling connection and accepts it. A new H.245 control channel according to the virtual channel selected may be set up at 712.

The endpoints, however, do not open the new media channel according to the virtual channel selected, until the previous channel is dropped, at 713. The "old" H.245 signaling channel is dropped at this time, as well. Finally, once the old media channel has been closed, the new media channel is opened between the endpoints Client 1 and Client 2. The call may be disconnected using standard end session signaling.

The invention described in the above detailed description is not intended to be limited to the specific form set forth herein, but is intended to cover such alternatives, modifications and equivalents as can reasonably be included within the spirit and scope of the appended claims.

What is claimed is:

1. A telecommunications device, comprising:
    a memory configured to store a plurality of virtual channels, wherein at least one of said plurality of virtual channels is associated with one or more actions to change one or more call settings, said call settings including at least one of codec settings, jitter buffer, noise filter, or echo filter settings;
    a virtual channel selector configured by a user to select another of said plurality of virtual channels, wherein said selection causes the one or more actions to be taken while a call is ongoing; and
    an inference engine configured to analyze a real time control protocol (RTCP) statistic and provide suggestions, based on said analysis, to the user for consideration as one of said virtual channels.

2. The telecommunications device in accordance with claim 1, wherein said virtual channel selector is configured to supervise a new H.245control channel.

3. The telecommunications device in accordance with claim 1, further including a user interface for selecting which of said virtual channels is to be set.

4. The telecommunications device in accordance with claim 3, wherein said memory is further configured to store a most recently used virtual channel and apply said virtual channel to initiate a subsequent call.

5. A telecommunications system, comprising:
    a network; and
    a plurality of endpoint telecommunications devices operably coupled to said network, at least one of said plurality of endpoint telecommunications devices including a virtual channel selector, a memory configured to store a plurality of virtual channels and an inference engine configured to analyze a real time control protocol (RTCP) statistic and provide suggestions, based on said analysis, to a user for consideration as one of said virtual channels, wherein at least one of the plurality of virtual channels is associated with one or more actions to change one or more call settings, such that said virtual channel selector can cause the one or more actions to be taken while a call with another of said plurality of endpoint telecommunications devices is ongoing by changing to another of said virtual channels.

6. The telecommunications system in accordance with claim 5, wherein said virtual channel selector is configured to supervise a new H.245control channel.

7. The telecommunications system in accordance with claim 6, said at least one of said plurality of endpoint telecommunications devices further including a user interface for selecting which of said virtual channels is to be set.

8. The telecommunications system in accordance with claim 7, wherein said memory is further configured to store a most recently used virtual channel and apply said virtual channel to initiate a subsequent call.

9. The telecommunications system in accordance with claim 5, wherein said plurality of call settings include codec settings, jitter buffer, noise filter, and echo filter settings.

10. The telecommunications system in accordance with claim 5, wherein said virtual channels are changeable by a user selecting a virtual channel from a graphical user interface.

11. A telecommunications method, comprising:
    storing a plurality of virtual channels in an endpoint telecommunications device, wherein at least one of the plurality of virtual channels is associated with one or more actions to change one or more call settings;
    establishing a call between at least a first party and a second party using a first call setting;
    changing said first call setting during said call by selecting a new virtual channel and causing the one or more actions to be taken; and
    analyzing a real time control protocol (RTCP) statistic and providing suggestions, based on said analysis, to the user for consideration as one of said virtual channels.

12. The telecommunications method in accordance with claim 11, further comprising saving a selected most-recently used virtual channel as a default channel for a next call.

13. The telecommunications method in accordance with claim 11, wherein said call settings include noise filters, echo cancellation, or codec selection.

14. The telecommunications method in accordance with claim 11, wherein said endpoint telecommunications device further includes a user interface for selecting which of said virtual channels is to be set.

15. A telecommunications method, comprising:

storing a plurality of virtual channels in an endpoint telecommunications device, wherein at least one of the plurality of virtual channels is associated with one or more actions to change one or more call settings;

establishing a call between at least a first party and a second party using a first call setting; and changing said first call setting during said call by selecting a new virtual channel and causing the one or more actions to be taken, wherein said changing comprises re-establishing an H.245 connection with new channel settings while said call is ongoing; and analyzing a real time control protocol (RTCP) statistic and providing suggestions, based on said analysis, to the user for consideration as one of said virtual channels.

16. A telecommunications method, comprising:

providing a network; and storing a plurality of virtual channels in a memory of at least one of a plurality of endpoint telecommunications devices operably coupled to said network, wherein at least one of the plurality of virtual channels is associated with one or more actions to change one or more call settings, such that a virtual channel selector in the at least one of said plurality of endpoint telecommunications devices changes said one or more call settings while a call with another of said plurality of endpoint telecommunications devices is ongoing by changing to another of said virtual channels and causing the one or more actions to be taken, wherein an inference engine in the at least one of said plurality of endpoint telecommunications devices is configured to analyze a real time control protocol (RTCP) statistic and provide suggestions, based on said analysis, to a user for consideration as one of said virtual channels.

17. The telecommunications method in accordance with claim 16, wherein said virtual channel selector is configured to supervise a new H.245 control channel.

18. The telecommunications method in accordance with claim 17, said at least one of said plurality of endpoint telecommunications devices further including a user interface for selecting which of said virtual channels is to be set.

19. The telecommunications method in accordance with claim 18, wherein said memory is further configured to store a most recently used virtual channel and apply said virtual channel to initiate a subsequent call.

* * * * *